United States Patent
Swales et al.

(10) Patent No.: US 8,152,682 B2
(45) Date of Patent: Apr. 10, 2012

(54) 8-SPEED HYBRID TRANSMISSION ARCHITECTURES

(75) Inventors: Shawn H. Swales, Canton, MI (US); Joel M. Maguire, Northville, MI (US); Andrew W. Phillips, Rochester, MI (US); Clinton E. Carey, Monroe, MI (US); James B. Borgerson, Auburn Hills, MI (US); Donald L. Dusenberry, Farmington Hills, MI (US); James M. Hart, Belleville, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 725 days.

(21) Appl. No.: 12/211,288

(22) Filed: Sep. 16, 2008

(65) Prior Publication Data

US 2010/0069191 A1    Mar. 18, 2010

(51) Int. Cl.
*F16H 3/62* (2006.01)
(52) U.S. Cl. ..................................................... 475/275
(58) Field of Classification Search .......... 475/275–278, 475/284, 296
See application file for complete search history.

(56) References Cited

U.S. PATENT DOCUMENTS

| | | | |
|---|---|---|---|
| 5,558,595 A | 9/1996 | Schmidt et al. | |
| 5,931,757 A | 8/1999 | Schmidt | |
| 6,478,705 B1 | 11/2002 | Holmes et al. | |
| 6,527,658 B2 | 3/2003 | Holmes et al. | |
| 6,569,054 B2 * | 5/2003 | Kato | 477/5 |
| 6,962,545 B2 | 11/2005 | Larkin | |
| 7,621,840 B2 * | 11/2009 | Kamm et al. | 475/275 |
| 7,699,741 B2 * | 4/2010 | Hart et al. | 475/271 |
| 7,704,180 B2 * | 4/2010 | Wittkopp et al. | 475/275 |
| 7,736,260 B2 * | 6/2010 | Hart et al. | 475/276 |
| 7,824,299 B2 * | 11/2010 | Hart et al. | 475/275 |
| 7,828,096 B2 * | 11/2010 | Hoher et al. | 180/65.6 |
| 7,828,691 B2 * | 11/2010 | Phillips et al. | 475/288 |
| 7,887,457 B2 * | 2/2011 | Wittkopp et al. | 475/277 |

FOREIGN PATENT DOCUMENTS

DE    102005002337    * 10/2006
* cited by examiner

*Primary Examiner* — Ha D. Ho
(74) *Attorney, Agent, or Firm* — Quinn Law Group, PLLC

(57) ABSTRACT

The hybrid powertrain has a plurality of members that can be utilized to provide eight forward speed ratios and one reverse speed ratio in a hybrid transmission architecture. The transmission includes three planetary gear sets having five torque-transmitting devices and four fixed interconnections. The powertrain includes an engine, a damper, a pump, an engine disconnect clutch, and a drive motor, all operatively connected with the transmission to provide strong hybrid operating capability.

19 Claims, 5 Drawing Sheets

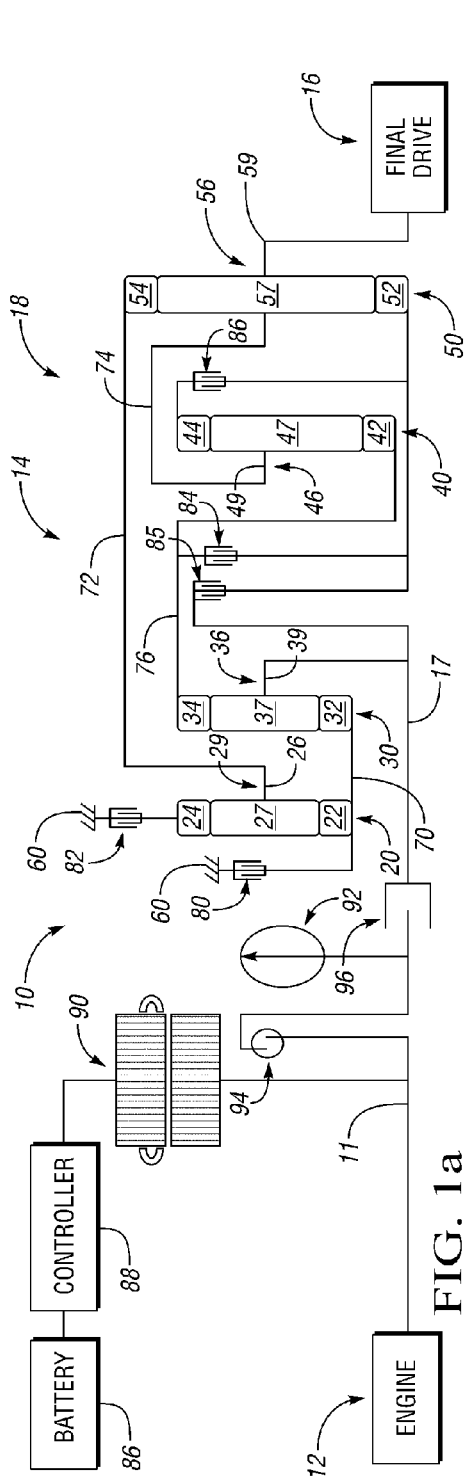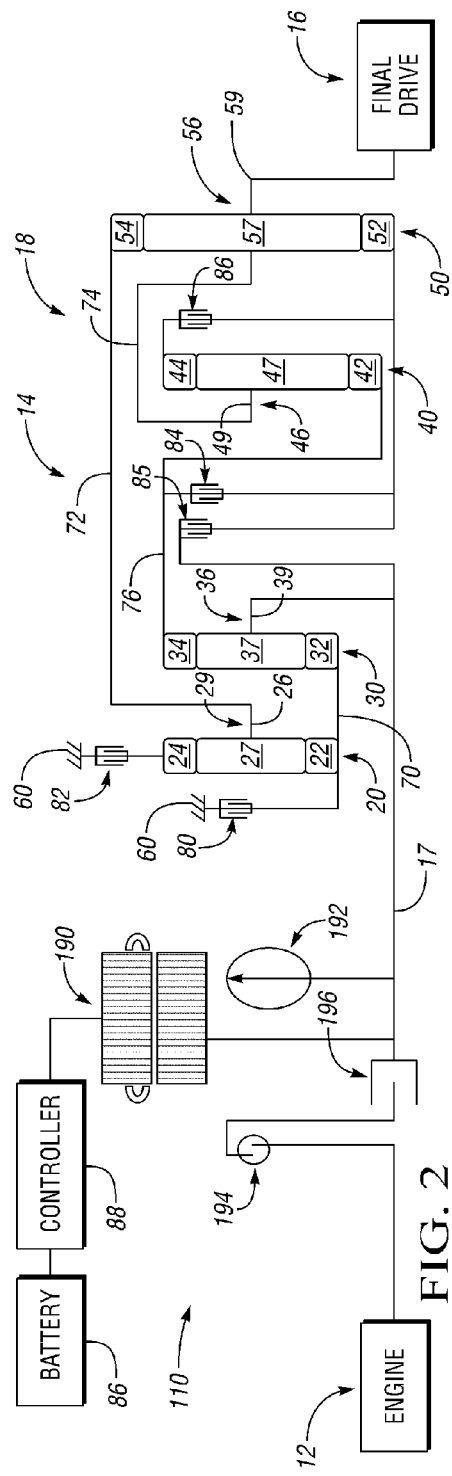

| R1/S1 | R2/S2 | R3/S3 | R4/S4 |
|---|---|---|---|
| 1.943 | 1.943 | 1.897 | 3.615 |
| P1/S1 | P2/S2 | P3/S3 | P4/S4 |
| 0.472 | 0.472 | 0.448 | 1.308 |

| GEAR STATE | Gear Ratio | Ratio Step | Cb1278r clutch Gnd S1 | Cb12345r clutch Gnd R1 | C23468 clutch R2 S4 | C13567 clutch PC2 S4 | C45678R clutch R3 S4 |
|---|---|---|---|---|---|---|---|
| Rev | -3.867 | | X | X | | | X |
| N | | -0.84 | O | O | | | |
| 1st | 4.615 | | X | X | | X | |
| 2nd | 3.047 | 1.51 | X | X | X | | |
| 3rd | 2.071 | 1.47 | | X | X | X | |
| 4th | 1.660 | 1.25 | | X | X | | X |
| 5th | 1.261 | 1.32 | | X | | X | X |
| 6th | 1.000 | 1.26 | | | X | X | X |
| 7th | 0.849 | 1.18 | X | | | X | X |
| 8th | 0.660 | 1.29 | X | | X | | X |

Overall Ratio: 6.99

X = On, Carrying Torque
O = On, NOT Carrying Torque

FIG. 1b

8-SPEED HYBRID TRANSMISSION ARCHITECTURES

TECHNICAL FIELD

The present invention relates to a hybrid powertrain having a drive motor and a transmission with four planetary gear sets that are controlled by five torque-transmitting devices to provide eight forward speed ratios and one reverse speed ratio in a hybrid transmission architecture.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

Hybrid systems may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by a motor acting as a generator during periods when the engine is operating is utilized during these engine off periods. Transient demand for engine torque or power is supplemented by the motor during operation in engine-on, electric modes, allowing for downsizing the engine without reducing apparent vehicle performance. Additionally, the engine may be operated at or near the optimal efficiency point for a given power demand. The motor/generator is able to capture vehicle kinetic energy during braking, which is used to keep the engine off longer, supplement engine torque or power and/or operate at a lower engine speed, or supplement accessory power supplies. Additionally, the motor/generator is very efficient in accessory power generation and electric power from the battery serves as an available torque reserve allowing operation at a relatively low transmission numerical speed ratio.

SUMMARY OF THE INVENTION

The preferred embodiment of the present invention provides an improved hybrid powertrain with a drive motor, damper, launch device (such as a clutch, torque converter or fluid coupling) and a transmission having four planetary gear sets controlled to provide at least eight forward speed ratios and at least one reverse speed ratio.

The transmission family of the present invention has four planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the first member of the first planetary gear set with the first member of the second planetary gear set.

A second interconnecting member continuously connects second member of the first planetary gear set with the third member of the fourth planetary gear set.

A third interconnecting member continuously connects the second member of the third planetary gear set with the second member of the fourth planetary gear set.

A fourth interconnecting member continuously connects the third member of the second planetary gear set with the first member of the third planetary gear set.

The input member is continuously connected with the second member of the second planetary gear set.

The output member is continuously connected with the second member of the fourth planetary gear set.

A first torque-transmitting device, such as a brake, selectively connects the first member of the first planetary gear set with a stationary member (transmission housing/casing).

A second torque-transmitting device, such as a brake, selectively connects the third member of the first planetary gear set with a stationary member (transmission housing/casing).

A third torque-transmitting device, such as a clutch, selectively connects the third member of the second planetary gear set with the first member of the fourth planetary gear set.

A fourth torque-transmitting device, such as a clutch, selectively connects the second member of the second planetary gear set with the first member of the fourth planetary gear set.

A fifth torque-transmitting device, such as a clutch, selectively connects the third member of the third planetary gear set with the first member of the fourth planetary gear set.

The five torque-transmitting devices are selectively engageable in combinations of three to yield at least eight forward speed ratios and at least one reverse speed ratio.

The desired input/output speed ratios can be realized by suitable selection of the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission in accordance with the present invention;

FIG. 1b is a truth table and chart depicting some of the operating characteristics of the powertrain shown in FIG. 1a; and FIG. 2 is schematic representation of the alternative embodiment of the powertrain of FIG. 1;

DESCRIPTION OF THE PREFERRED EMBODIMENTS

Figure 3:
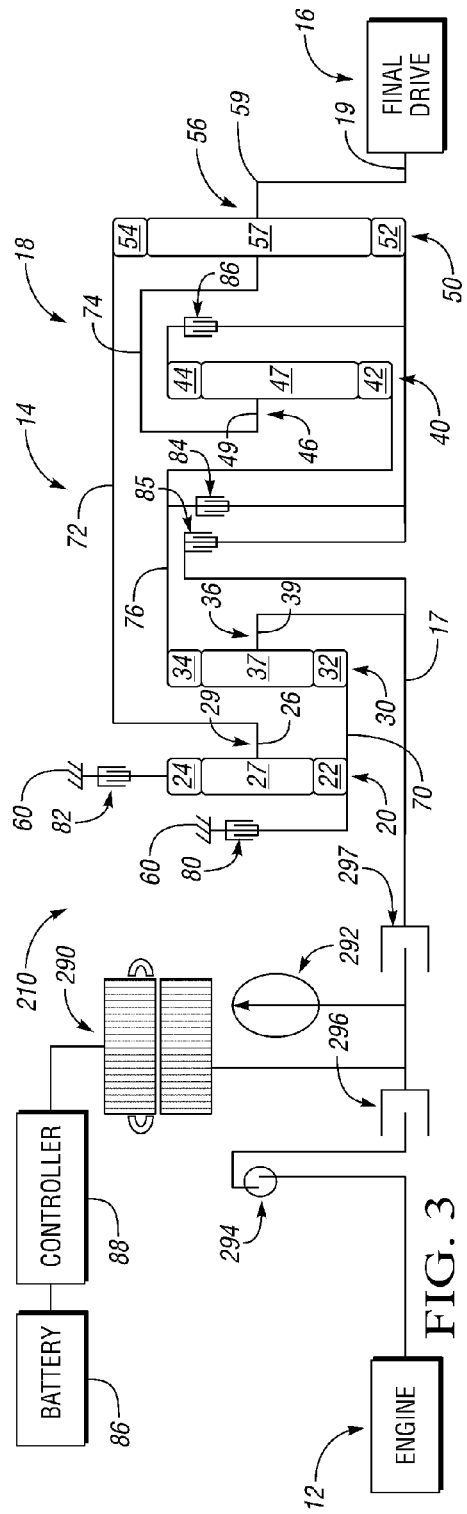
FIG. 3 is schematic representation of another embodiment of the powertrain of FIG. 1.

Referring to the drawings, there is shown in FIG. 1a a powertrain 10 having a conventional engine 12, a planetary transmission 14, a conventional final drive mechanism 16, a drive motor 90, a pump 92, a damper 94 and a disconnect clutch 96. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17, a planetary gear arrangement 18, and an output member 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear set 50 includes a sun gear member 52, a ring gear member 54, and a planet carrier assembly member 56. The planet carrier assembly member 56 includes a plurality of pinion gears 57 mounted on a carrier member 59 and disposed in meshing relationship with both the ring gear member 54 and the sun gear member 52.

The planetary gear arrangement also includes five torque-transmitting devices 80, 82, 84, 85 and 86. The torque-transmitting devices 80 and 82 are stationary-type torque-transmitting devices, commonly termed brakes or reaction clutches. The torque-transmitting devices 84, 85 and 86 are rotating-type torque-transmitting devices, commonly termed clutches.

The input member 17 is continuously connected with the planet carrier assembly member 36 of the planetary gear set 30. The output member 19 is continuously connected with the planet carrier assembly member 56 of the planetary gear set 50.

A first interconnecting member 70 continuously connects the sun gear member 22 of the planetary gear set 20 with the sun gear member 32 of the planetary gear set 30. A second interconnecting member 72 continuously connects the planet carrier assembly member 26 of the planetary gear set 20 with the ring gear member 54 of the planetary gear set 50. A third interconnecting member 74 continuously connects the planet carrier assembly member 46 of the planetary gear set 40 with the planet carrier assembly member 56 of the planetary gear set 50. A fourth interconnecting member 76 continuously connects the ring gear member 34 of the planetary gear set 30 with the sun gear member 42 of the planetary gear set 40.

A first torque-transmitting device, such as brake 80, selectively connects the sun gear member 22 of the planetary gear set 20 with the transmission housing 60. A second torque-transmitting device, such as brake 82, selectively connects the ring gear member 24 of the planetary gear set 20 with the transmission housing 60. A third torque-transmitting device, such as clutch 84, selectively connects the ring gear member 34 of the planetary gear set 30 with the sun gear member 52 of the planetary gear set 50. A fourth torque-transmitting device, such as clutch 85, selectively connects the planet carrier assembly member 36 of the planetary gear set 30 with the sun gear member 52 of the planetary gear set 50. A fifth torque-transmitting device, such as clutch 86, selectively connects the ring gear member 44 of the planetary gear set 40 with the sun gear member 52 of the planetary gear set 50.

The powertrain 10 of FIG. 1a includes a motor/generator 90 placed after the engine 12, but before the damper 94, pump 92, launch device 96 (such as a clutch, torque converter or fluid coupling) and planetary transmission 14.

Each embodiment of the transmission within the scope of the invention has an electric power source which is operatively connected to the motor/generator such that the motor/generator may transfer power to or receive power from the power source. A controller or ECU is operatively connected to the electric power source to control the distribution of power from or to the power source. An electric power source may be one or more batteries. Other electric power sources, such as fuel cells, have the ability to provide, or store and dispense, electric power and may be used in place of batteries without altering the concepts of the present invention.

Returning now to the description of the power sources, it should be apparent from the foregoing description, and with particular reference to FIG. 1a, that the transmission 14 selectively receives power from the engine 12. The hybrid transmission also receives power from an electric power source 86, which is operably connected to a controller 88. The electric power source 86 may be one or more batteries. Other electric power sources, such as capacitors or fuel cells, that have the ability to provide, or store, and dispense electric power may be used in place of or in combination with batteries without altering the concepts of the present invention. The speed ratio between the engine crankshaft 11 and the transmission output shaft is prescribed by the state of the clutches 80, 82, 84, 85, 86, 96 and the ring gear/sun gear tooth ratios of the planetary gear sets. Those with ordinary skill in the transmission art will recognize that desired input/output speed ratios can be realized by suitable selection of the state of the clutches 80, 82, 84, 85, 86, 96 and selection of suitable tooth ratios of the planetary gear sets 20, 30, 40 and 50.

As shown in FIG. 1b, and in particular the truth table disclosed therein, the torque-transmitting devices are selectively engaged in combinations of three to provide at least eight forward speed ratios and at least one reverse speed ratio, all with single transition sequential shifts.

The embodiment shown in FIG. 1a enables strong hybrid fuel economy with minimal content in the transmission bell housing. It also provides excellent control over engine starting/stopping because the motor/generator 90 is directly connected to the engine crankshaft 11.

In FIG. 2, a powertrain 110 is shown having a conventional engine 12, a planetary transmission 14, a final drive mechanism 16, a drive motor 190, a pump 192, a damper 194 and a disconnect clutch 196. The drive motor 190 is placed after the engine 12, damper 194, and disconnect clutch 196, but before the pump 192 and planetary transmission 14. The planetary transmission 14 is the same as that shown in FIG. 1a, so the description is not repeated here. Like reference numbers are used in the various embodiments to identify like components.

The embodiment of FIG. 2 enables strong hybrid fuel economy, and only requires the motor 190, damper 194 and disconnect clutch 196 in the transmission bell housing. Electric-only operation is achieved by opening the disconnect clutch 196.

In FIG. 3, a powertrain 210 is shown having a conventional engine 12, a planetary transmission 14, a final drive mechanism 16, a drive motor 290, a pump 292, a damper 294, an engine disconnect clutch 296, and a friction launch clutch 297. In this embodiment, the drive motor 290 is placed after the engine 12, damper 294 and disconnect clutch 296, but before the pump 292, friction launch clutch 297 and the planetary transmission 14.

The embodiment of FIG. 3 enables strong hybrid fuel economy, and permits electric-only operation by opening the engine disconnect clutch 296. The launch clutch 297 is specifically designed for this purpose, as opposed to slipping the brakes 80, 82 for launch.

Figure 4:
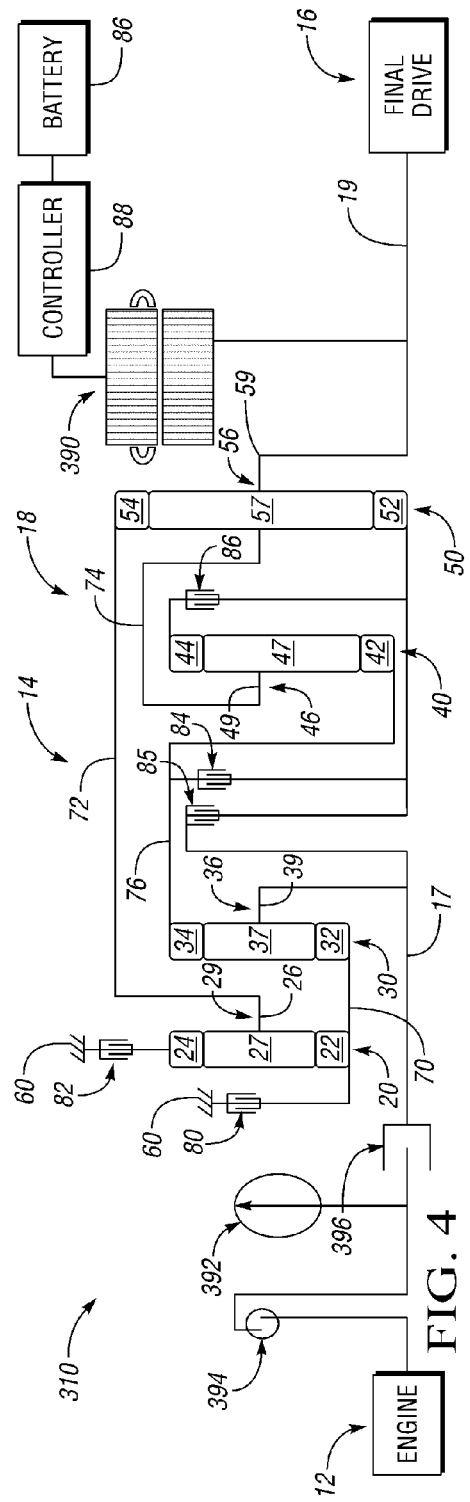
FIG. 4 is schematic representation of another embodiment of the powertrain of FIG. 1.

Referring to FIG. 4, a powertrain 310 is shown having a conventional engine 12, a planetary transmission 14, a final drive mechanism 16, a drive motor 390, a pump 392, a damper 394 and a disconnect clutch 396. The drive motor 390 is connected to the output member 19, after the engine 12, damper 394, pump 392, disconnect clutch 396 and planetary transmission 14.

The embodiment of FIG. 4 enables strong hybrid fuel economy, and permits electric-only operation achieved by opening an internal transmission clutch.

Figure 5:
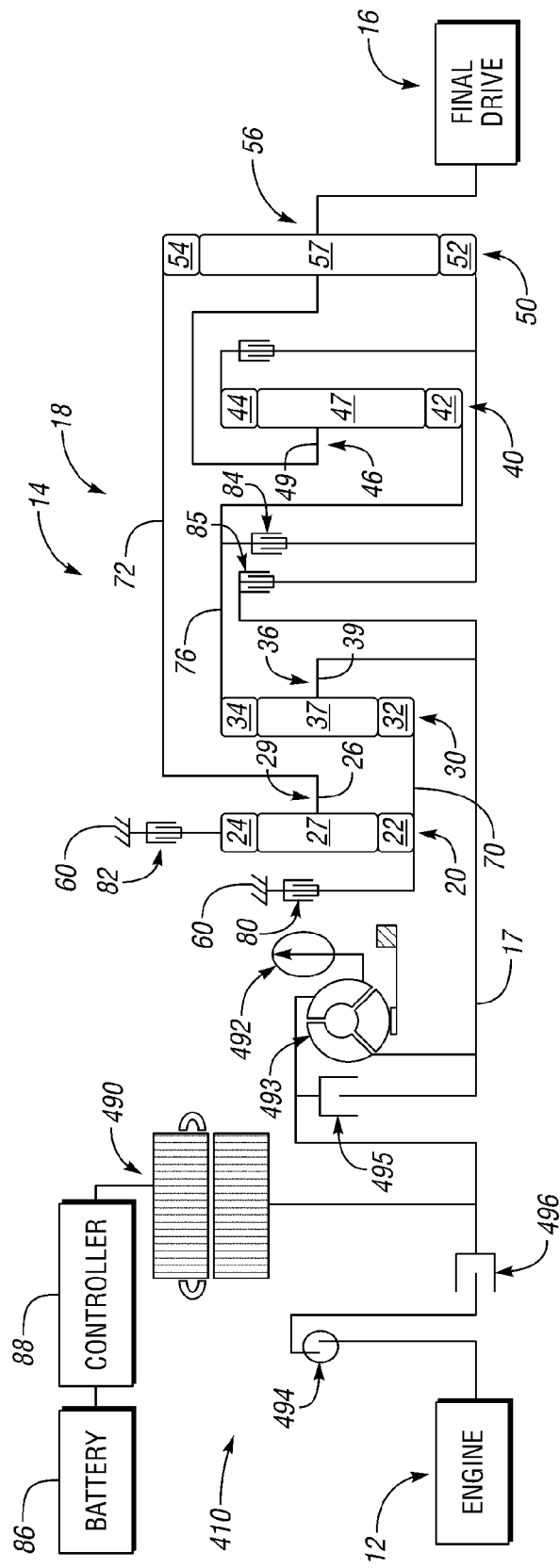
FIG. 5 is schematic representation of another embodiment of the powertrain of FIG. 1.

In FIG. 5, a powertrain 410 is shown having a conventional engine 12, a planetary transmission 14, a final drive mechanism 16, a drive motor 490, a pump 492, a fluid coupling device (such as a torque converter) 493, a damper 494, and a disconnect clutch 496. A torque converter bypass clutch 495 is also provided for improving fuel economy under certain operating conditions.

Figure 6:
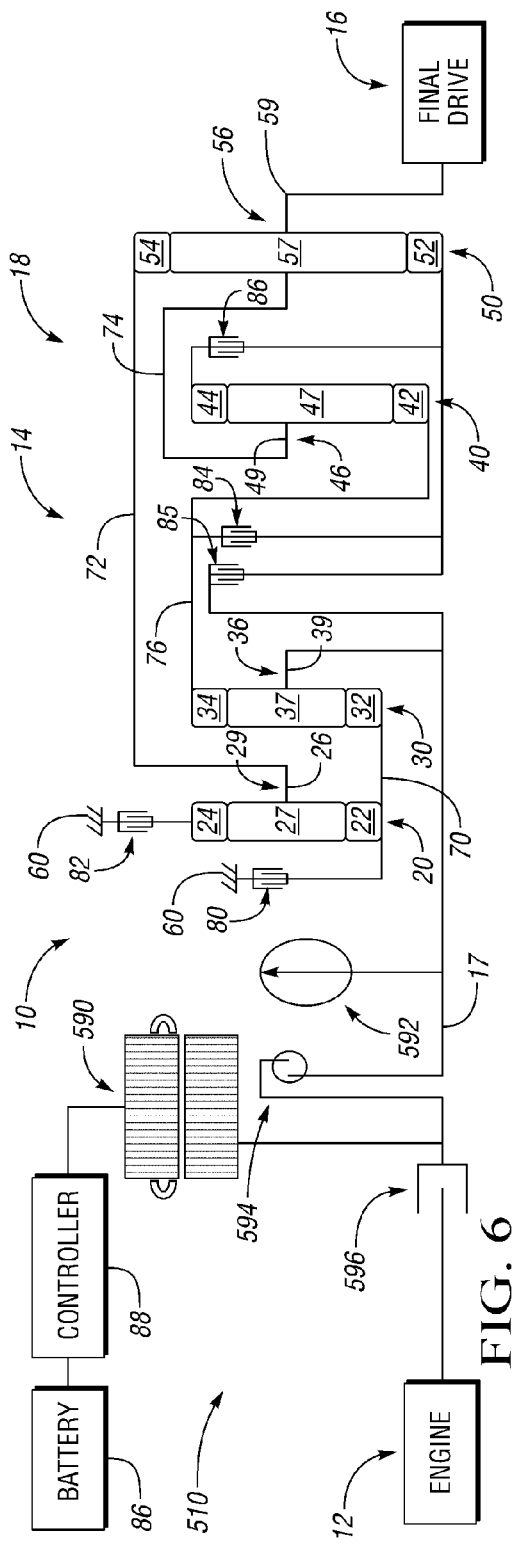
FIG. 6 is schematic representation of another embodiment of the powertrain of FIG. 1.

In FIG. 6, a powertrain 510 is shown having a conventional engine 12, a planetary transmission 14, a final drive mechanism 16, a drive motor 590, a pump 592, a damper 594 and a launch device/disconnect clutch 596. The drive motor 590 is placed after the engine 12 and disconnect clutch 596, but before the damper 594, pump 592 and planetary transmission 14.

Figure 7:
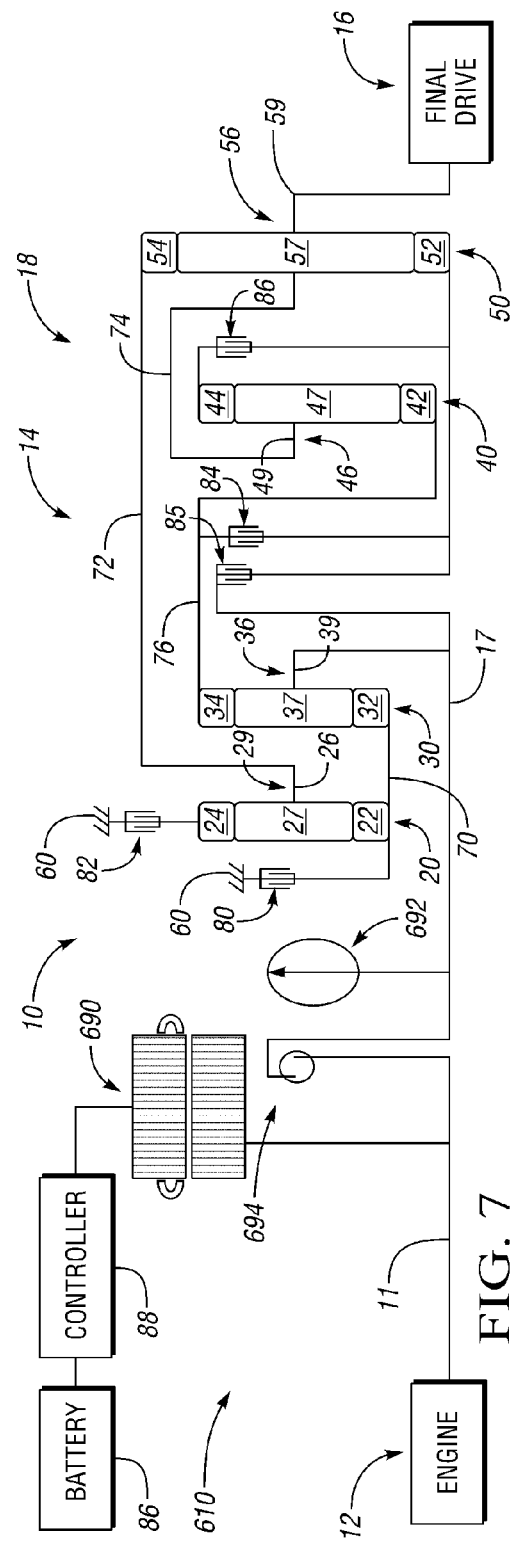
FIG. 7 is schematic representation of another embodiment of the powertrain of FIG. 1.

In FIG. 7, a powertrain 610 is shown having a conventional engine 12, a planetary transmission 14, a final drive mechanism 16, a drive motor 690, a pump 692, and a damper 694. This embodiment includes no disconnect clutch. The brakes 80, 82 may be operative as a launch device. The drive motor 690 is placed after the engine 12, and before the damper 694, the pump 192 and the planetary transmission 14.

Each of the above-described powertrains 10, 110, 210, 310, 410 may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted below a minimum allowable level before the destination is reached. A conventional hybrid vehicle operates in a "charge-sustaining mode", wherein if the battery charge level drops below a predetermined level (e.g., 50%) the engine is automatically run to recharge the battery. Therefore, by operating in a charge-depleting mode, the hybrid vehicle can conserve some or all of the fuel that would otherwise be expended to maintain the 50% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain comprising:
an engine;
a multi-speed transmission having
   an input member;
   an output member;
   first, second, third and fourth planetary gear sets each having first, second and third members; wherein at least one of said planetary gear sets is located radially outward of and concentrically surrounds the input member;
   a first interconnecting member continuously connecting said first member of said first planetary gear set with said first member of said second planetary gear set;
   a second interconnecting member continuously connecting said second member of said first planetary gear set with said third member of said fourth planetary gear set;
   a third interconnecting member continuously connecting said second member of said third planetary gear set with said second member of said fourth planetary gear set;
   a fourth interconnecting member continuously connecting said third member of said second planetary gear set with said first member of said third planetary gear set;
   wherein said first, second and third members of said first, second, third and fourth planetary gear sets comprise a sun gear member, a planet carrier assembly member and a ring gear member, respectively;
   five torque-transmitting devices for selectively interconnecting said members of said planetary gear sets with a stationary member, or with other members of said planetary gear sets, said five torque-transmitting devices being engaged in combinations of three to establish at least eight forward speed ratios and at least one reverse speed ratio between said input member and said output member; and
a drive motor, a damper, and a pump operatively connected with the multi-speed transmission and the engine.

2. The powertrain of claim 1, wherein a first of said five torque-transmitting devices is operable for selectively connecting said first member of said first planetary gear set with said stationary member.

3. The powertrain of claim 2, wherein a second of said five torque-transmitting devices is operable for selectively connecting said third member of said first planetary gear set with said stationary member.

4. The powertrain of claim 3, wherein a third of said five torque-transmitting devices is operable for selectively connecting said third member of said second planetary gear set with said first member of said fourth planetary gear set.

5. The powertrain of claim 4, wherein a fourth of said five torque-transmitting devices is operable for selectively connecting said second member of said second planetary gear set with said first member of said fourth planetary gear set.

6. The powertrain of claim 5, wherein a fifth of said five torque-transmitting devices is operable for selectively connecting said first member of said fourth planetary gear set with said third member of said third planetary gear set.

7. The powertrain defined in claim 1, wherein two of said five torque-transmitting devices comprises brakes, and the others of said five torque-transmitting devices comprise clutches.

8. The powertrain of claim 1, wherein said input member is continuously interconnected with said second member of said second planetary gear set; and said output member is continuously interconnected with said second member of said fourth planetary gear set.

9. The powertrain of claim 1, wherein said drive motor is placed after said engine, and before said damper, said pump and said input member of the transmission.

10. The powertrain of claim 1, further comprising a launch device, wherein said drive motor is placed after said engine, and before said damper, said pump, said launch device, and said input member of the transmission.

11. The powertrain of claim 1, further comprising a launch device, wherein said drive motor is placed after said engine, said damper, and said launch device and before said pump and said input member of the transmission.

12. The powertrain of claim 1, further comprising a launch device, wherein said drive motor is placed after said engine and said launch device, and before said pump, said damper and said input member of the transmission.

13. The powertrain of claim 1, further comprising a launch device, wherein said drive motor is operatively connected to said output member and after said engine, said damper, said pump, said launch device and said transmission.

14. The powertrain of claim 1, further comprising:
a disconnect clutch and a launch device; and wherein said drive motor is placed after said engine, said damper, and said disconnect clutch, and before said pump, said launch device and said input member of the transmission.

15. The powertrain of claim 1, further comprising
a disconnect clutch, a fluid coupling device and fluid coupling bypass clutch; and wherein said drive motor is operatively connected after said engine, said damper, and said disconnect clutch and before said fluid coupling, said fluid coupling bypass clutch, said pump, and said transmission.

16. A hybrid powertrain comprising:
an engine;
a multi-speed transmission comprising
an input member;
an output member;
first, second, third and fourth planetary gear sets each having first, second and third members;
said input member being continuously interconnected with said second member of said second planetary gear set; and said output member being continuously interconnected with said second member of said fourth planetary gear set;
a first interconnecting member continuously connecting said first member of said first planetary gear set with said first member of said second planetary gear set;
a second interconnecting member continuously connecting said second member of said first planetary gear set with said third member of said fourth planetary gear set;
a third interconnecting member continuously connecting said second member of said third planetary gear set with said second member of said fourth planetary gear set;
a fourth interconnecting member continuously connecting said third member of said second planetary gear set with said first member of said third planetary gear set;
a first torque-transmitting device selectively connecting said first member of said first planetary gear set with a stationary member;
a second torque-transmitting device selectively connecting said third member of said first planetary gear set with said stationary member;
a third torque-transmitting device selectively connecting said third member of said second planetary gear set with said first member of said fourth planetary gear set;
a fourth torque-transmitting device selectively connecting said second member of said second planetary gear set with said first member of said fourth planetary gear set;
a fifth torque-transmitting device selectively connecting said third member of said third planetary gear set with said first member of said fourth planetary gear set;
said torque-transmitting devices being engaged in combinations of three to establish at least eight forward speed ratios and at least one reverse speed ratio between said input member and said output member:
a final drive, a motor drive, a pump, a damper, and a launch device operatively connected with said engine and said transmission.

17. The powertrain of claim 16, wherein said drive motor is placed after said engine, and before said damper, said pump, said launch device and said input member of the transmission.

18. The powertrain of claim 16, wherein said drive motor is placed after said engine, said damper, and said launch device and before said pump and said input member of the transmission.

19. A hybrid powertrain comprising:
an engine:
a multi-speed transmission having
an input member;
an output member;
first, second, third and fourth planetary gear sets each having first, second and third members;
a first interconnecting member continuously connecting said first member of said first planetary gear set with said first member of said second planetary gear set;

a second interconnecting member continuously connecting said second member of said first planetary gear set with said third member of said fourth planetary gear set;

a third interconnecting member continuously connecting said second member of said third planetary gear set with said second member of said fourth planetary gear set;

a fourth interconnecting member continuously connecting said third member of said second planetary gear set with said first member of said third planetary gear set;

five torque-transmitting devices for selectively interconnecting said members of said planetary gear sets with a stationary member, or with other members of said planetary gear sets, said five torque-transmitting devices being engaged in combinations of three to establish at least eight forward speed ratios and at least one reverse speed ratio between said input member and said output member;

wherein a first of said five torque-transmitting devices is operable for selectively connecting said first member of said first planetary gear set with said stationary member;

wherein a second of said five torque-transmitting devices is operable for selectively connecting said third member of said first planetary gear set with said stationary member;

wherein a third of said five torque-transmitting devices is operable for selectively connecting said third member of said second planetary gear set with said first member of said fourth planetary gear set; and a drive motor, a damper, and a pump operatively connected with the multi-speed transmission and the engine.

* * * * *